United States Patent
Duwel

(10) Patent No.: US 11,384,966 B2
(45) Date of Patent: Jul. 12, 2022

(54) COOLER WITH REMOTE HEAT SINK

(71) Applicant: The Charles Stark Draper Laboratory, Inc., Cambridge, MA (US)

(72) Inventor: Amy E. Duwel, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 622 days.

(21) Appl. No.: 14/665,910

(22) Filed: Mar. 23, 2015

(65) Prior Publication Data
US 2015/0267944 A1 Sep. 24, 2015

Related U.S. Application Data

(60) Provisional application No. 61/968,506, filed on Mar. 21, 2014.

(51) Int. Cl.
*F25B 21/00* (2006.01)
*H01F 1/01* (2006.01)

(52) U.S. Cl.
CPC .............. *F25B 21/00* (2013.01); *H01F 1/015* (2013.01); *Y02B 30/00* (2013.01)

(58) Field of Classification Search
CPC .......... F25B 21/00; F25B 21/02; F25B 21/04; F25B 2321/002; H01F 1/015; Y02B 30/66; H01L 23/38; Y10S 257/93; F25J 1/0022
See application file for complete search history.

(56) References Cited

U.S. PATENT DOCUMENTS

| 5,357,756 A | 10/1994 | Lubell |
| 5,376,184 A * | 12/1994 | Aspden ............... H01L 35/00 |
| | | 136/203 |
| 5,714,829 A * | 2/1998 | Guruprasad .......... H02N 10/00 |
| | | 310/306 |
| 6,588,215 B1 | 7/2003 | Ghoshal |

(Continued)

FOREIGN PATENT DOCUMENTS

WO WO-93/25857 A1 12/1993

*Primary Examiner* — Frantz F Jules
*Assistant Examiner* — Webeshet Mengesha
(74) *Attorney, Agent, or Firm* — Foley & Lardner LLP

(57) ABSTRACT

The systems and methods described herein relate to remote cooling. More particularly, the systems described herein include a side to be cooled coupled to an object to be cooled, and a side where heat is dissipated at a distant location. The side to be cooled includes a thermodynamic energy converter and a coil that is electrically coupled to the thermodynamic energy converter. The side where heat is dissipated includes a coil configured to inductively couple with the coil of the side to be cooled. The side where heat is dissipated also includes a heating element electrically coupled to the second coil. The heating element is configured to convert electrical energy into thermal energy. The thermodynamic energy converter absorbs thermal energy from the object to be cooled and converts, directly or indirectly, the thermal energy into electrical energy. The electrical energy is transmitted from the side to be cooled to the side where heat is dissipated by wirelessly coupling the cold and side where heat is dissipated coils. At the side where heat is dissipated, the electrical energy is converted back into thermal energy by the heating element, and the thermal energy is dissipated.

16 Claims, 4 Drawing Sheets

(56) References Cited

U.S. PATENT DOCUMENTS

| | | |
|---|---|---|
| 6,588,216 B1 | 7/2003 | Ghoshal |
| 6,595,004 B1 * | 7/2003 | Ghoshal .................. F25B 21/00 |
| | | 62/3.1 |
| 6,657,358 B2 | 12/2003 | Perner |
| 8,104,293 B2 | 1/2012 | Barve et al. |
| 8,174,245 B2 | 5/2012 | Carver |
| 8,448,453 B2 | 5/2013 | Bahl et al. |
| 8,683,815 B2 | 4/2014 | Muller et al. |
| 8,695,354 B2 | 4/2014 | Heitzler et al. |
| 2011/0001389 A1 * | 1/2011 | Carver .................... H01L 37/00 |
| | | 310/306 |
| 2011/0030939 A1 | 2/2011 | Carroll et al. |
| 2011/0173993 A1 | 7/2011 | Muller et al. |
| 2011/0215088 A1 | 9/2011 | Muller et al. |
| 2011/0239662 A1 | 10/2011 | Bahl et al. |
| 2012/0023969 A1 * | 2/2012 | Subramaniam ......... F25B 21/00 |
| | | 62/3.1 |
| 2012/0031109 A1 | 2/2012 | Vetrovec |
| 2016/0284456 A1 * | 9/2016 | Lausch ................ H02N 11/002 |

\* cited by examiner

COOLER WITH REMOTE HEAT SINK

CROSS-REFERENCE TO RELATED APPLICATIONS

This application claims priority to U.S. Provisional Patent Application No. 61/968,506 filed on Mar. 21, 2014 and titled "Cooling with a Remote Heat Sink Using a Pyroelectric Design," which is herein incorporated by reference in its entirety.

BACKGROUND

Cooling systems, such as refrigerators and thermoelectric coolers, have a side where heat is dissipated and a side to be cooled that are physically connected through a gas, refrigerant, or other physical layer. Work is input into the cooling system to enable heat to be transported from the side to be cooled to the side where heat is dissipated of the system. The heat is transported between the two sides through the physical connection between the two sides.

SUMMARY OF THE DISCLOSURE

According to one aspect of the disclosure, a method for cooling an object includes providing a cooling device. The cooling device includes a side to be cooled and a side where heat is dissipated. The side to be cooled includes a first housing supporting a thermodynamic energy converter and a first inductive element electrically coupled to the thermodynamic energy converter. The side where heat is dissipated, which is spaced away from the side to be cooled, includes a second housing supporting a first coil configured to inductively couple with the first inductive element. The side where heat is dissipated also includes a heating element electrically coupled to the first coil. The heating element is configured to dissipate thermal energy using current induced through the first coil. The method also includes transferring thermal energy from the side to be cooled to the side where heat is dissipated. To transfer the thermal energy a thermodynamic energy converter absorbs thermal energy. Using a portion of the absorbed thermal energy, the first inductive element wirelessly couples with the first coil. The wireless coupling induces a second current to flow through the first coil. The second current flows to the heating element where thermal energy is generated with the electrical current.

In some implementations, the thermodynamic energy converter includes a magnetocaloric material. The magnetocaloric material can include at least one of gadolinium, lathanum, and manganese. In some implementations, the magnetocaloric material is the first inductive element. In other implementations, the thermodynamic energy converter includes a capacitor with a pyroelectric material. The pyroelectric material can include at least one of a ferroelectric ceramic and a ferroelectric crystal.

In some implementations, the first inductive element is a second coil. In some implementations, the transfer of thermal energy from the side to be cooled to the side where heat is dissipated also includes inducing, by the thermodynamic energy converter, using at least the portion of the absorbed thermal energy, an electric current through the first inductive element.

In some implementations, the method also includes wirelessly supplying electrical energy to the thermodynamic energy converter from the side where heat is dissipated of the cooling device, and using at least a portion supplied electrical energy to induce an electric current through the first inductive element.

In some implementations, wirelessly supplying the electrical energy to the thermodynamic energy converter adiabatically magnetizes the thermodynamic energy converter. Then adiabatically demagnetizing the thermodynamic energy converter cools the thermodynamic energy converter. In some implementations, the method can also include removing heat generated by the heating element with a coolant.

According to another aspect of the disclosure, a cooling device includes a side to be cooled and a side where heat is dissipated. The side to be cooled includes a thermodynamic energy converter that is configured to absorb thermal energy. The thermodynamic energy converter is configured to induce a first current using at least a portion of the absorbed thermal energy. The side to be cooled also includes a first inductive element electrically coupled to the thermodynamic energy converter. The first inductive element is configured to wirelessly couple with a first coil in the side where heat is dissipated when the first current flows through the first inductive element. The side where heat is dissipated of the cooling device is spaced away from the side to be cooled. The side where heat is dissipated includes the first coil, which is configured induce a second current through the first coil when wirelessly coupled with the first inductive element. The side where heat is dissipated also includes a heating element electrically coupled to the first coil and configured to generate thermal energy using the second current.

In some implementations, the thermodynamic energy converter includes a magnetocaloric material. The magnetocaloric material can include at least one of gadolinium, lathanum, and manganese. In some implementations, the magnetocaloric material is the first inductive element. In other implementations, the thermodynamic energy converter includes a capacitor with a pyroelectric material. The pyroelectric material can include at least one of a ferroelectric ceramic and a ferroelectric crystal. In some implementations, the first inductive element is a second coil.

In some implementations, the thermodynamic energy converter is configured to induce the first current when adiabatically demagnetized. In some implementations, the side where heat is dissipated includes a power supply. The power supply is configured to flow a third current through the first coil to induce a fourth current in the first inductive element. When the thermodynamic energy converter is exposed to the fourth current, the thermodynamic energy converter adiabatically magnetizes. In some implementations, the cooling device also includes a coolant system coupled to the heat sink.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description of the invention.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
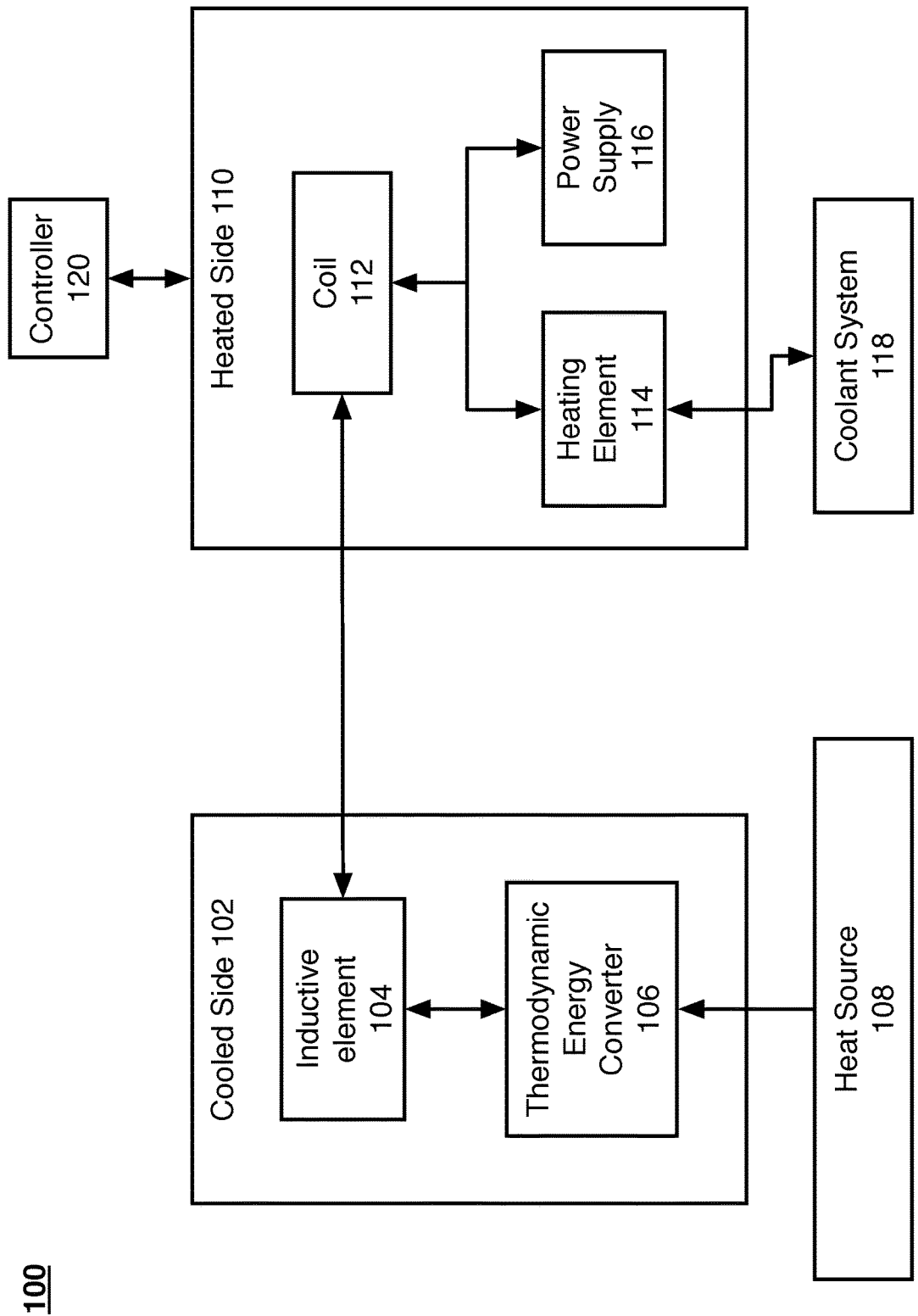
FIG. 1 illustrates a schematic of an example system for the remote dissipation of thermal energy.

FIG. 1 illustrates a schematic of an example system 100 for the remote dissipation of thermal energy. The system 100 includes a side to be cooled 102, which may also be referred to as a cold side or cooled side. The side to be cooled 102 includes an inductive element 104 that is electrically coupled to a thermodynamic energy converter (TEC) 106. A heat source 108 is coupled to the TEC 106 of the side to be cooled 102. The system 100 also includes a side where heat is dissipated 110, which may also be called a hot side or heated side, that is space away from the side to be cooled 102. The side where heat is dissipated 110 includes a coil 112 that is configured to inductively couple with the inductive element 104. A heating element 114 is electrically coupled to the coil 112. The side where heat is dissipated 110 also includes a power supply 116 that is electrically coupled to the coil 112 and the heating element 114. The system 100 also includes a coolant system 118 that is coupled to the heating element 114 and can aid in dissipating heat generated by the heating element 114. The side where heat is dissipated 110 also includes a controller 120 configured to control the system 100.

The side to be cooled 102 of the system 100 cools by absorbing and removing thermal energy from the environment surrounding the side to be cooled 102 and/or heat generated by the heat source 108. The side to be cooled 102 includes a housing that supports each of the components of the side to be cooled 102. In some implementations, the housing is a physical enclosure, such as a hermetically sealed package in which each of the components is included. In other implementations, the housing can be a housing of another device. For example, the side to be cooled 102 can be implemented as a component of an implantable pacemaker. In these or other implementations, some of the components of the side to be cooled 102 can be placed external to the housing of the side to be cooled 102. For example, the TEC 106 may be placed outside of the housing and directly onto the heat source 108 and may be electrically coupled to the inductive element 104 within the housing of the side to be cooled 102.

The TEC 106 of the side to be cooled 102 absorbs thermal energy and induces, using at least a portion of the absorbed thermal energy, an electrical current in the inductive element 104. In some implementations, the TEC 106 includes a pyroelectric material or a magnetocaloric material that absorbs thermal energy to induce the electrical current in the inductive element 104.

A pyroelectric material is a material that converts a change in temperature into a voltage. In some implementations, when the TEC 106 includes a pyroelectric material the TEC 106 is configured as a capacitor. The pyroelectric material is incorporated into the capacitor as part of the dielectric material of the capacitor. The pyroelectric material includes an intrinsic dipole moment that is temperature dependent. Electrodes are placed on either side of the pyroelectric material. When the pyroelectric material experiences an increase in temperature by absorbing thermal energy, the increase in temperature prompts a spontaneous polarization as the dipole moments diminish in magnitude. A current flow is generated to compensate for the change in bound charge that accumulates on the edges of pyroelectric material as the dipole moments change. In some implementations, the area and the thickness (e.g., the volume) of the pyroelectric material in the TEC 106 is proportional to the amount of current generated by the TEC 106. The pyroelectric material can include least one of a ferroelectric ceramic and a ferroelectric crystal. In some implementations pyroelectric material can include $BaTiO_3$, $PbZr_{0.95}TiO_3$, $LiBnO_3$, $LiTAO_3$, $Pb_5Ge_3O_{11}$, $Ba_2NaNb_5O_{15}$, $Sr_{0.5}BA_{0.5}Nb2O_6$, $(Ch_2CF_2)_n$, triglycine sulfate, CdSe, CdS, ZnO, tourmaline, $Li_2SO_4*2H_2O$, or a combination thereof.

In some implementations, the area of pyroelectric material in the capacitor is between about 0.5 cm² and about 3 cm², between about 0.5 cm² and about 1 cm², or between 0.5 cm² and about 1 cm². The distance between the electrodes on either side of the pyroelectric material is between about 0.1 mm and about 2 mm, between about 0.1 mm and about 1.5 mm, between about 0.1 mm and about 1 mm, or between about 0.1 mm and about 0.5 mm. In some implementations, each cooling cycle of a capacitor with pyroelectric material removes between about 1 pJ and about 10 pJ, between about 1 pJ and about 5 pJ, or between about 1 pJ and about 3 pJ of heat.

A magnetocaloric material is a material in which a temperature change gives rise to a magnetic field. Similarly, exposure of the magnetocaloric material to a magnetic field can give rise to a temperature change in the magnetocaloric material. Magnetocaloric materials can undergo magnetic phase transitions from the paramagnetic state to the ferromagnetic state when exposed to the Curie temperature of the magnetocaloric material. The magnetocaloric material can include gadolinium, lathanum, manganese, nickelates or an alloy thereof. In some implementations, the magnetocaloric material includes dopants such as hydrogen and lithium, which are incorporated into the complex crystal lattices of the magnetocaloric material by electrochemical doping. In some implementations, alloys of the magnetocaloric material are produced to control the Curie temperature of the alloy. For example, the magnetocaloric material may be configured to have a Curie temperature between about 250 K and about 450 K, between about 300 K and about 400 K, or between about 300 K and about 350 K. In implementations with a magnetocaloric material in the TEC 106, a coil is wound around the magnetocaloric material. When the magnetocaloric material absorbs thermal energy, the magnetocaloric material experiences a magnetic phase transition and generates a changing magnetic field. The change in the magnetic field induces a current through the coil wrapped around the magnetocaloric material. In some implementations, the magnetocaloric is implemented as one or more layers of a thin film of the magnetocaloric that are physically attached to the heat source 108.

The side to be cooled 102 of the system 100 also includes an inductive element 104. In some implementations, the inductive element 104 is an induction coil that is configured to inductively couple with the coil 112 of the side where heat is dissipated 110. As an induction coil, the inductive element 104 inductively couples with the coil 112 when current induced by the TEC 106 is flowed through the inductive element 104. The inductive coupling between the inductive element 104 and coil 112 induces a current flow through the side where heat is dissipated 110. As described below, the current induced in the coil 112 is used to dissipate thermal energy at the heating element 114 into the surrounding environment.

In some implementations, the side to be cooled 102 does not include an induction coil. In these implementations, the TEC 106 includes the inductive element 104 of the side to be cooled, which is configured to inductively couple with the coil 112 of the side where heat is dissipated 110. For example, when the TEC 106 includes a magnetocaloric material, the increase in heat to the magnetocaloric material causes a change in the magnetization of the magnetocaloric material of the TEC 106. The change in magnetization of the magnetocaloric material is detected by the coil 112 located a distance away from the TEC 106. The change in magnetization of the magnetocaloric material can directly induce a current through the coil 112 of the side where heat is dissipated 110. The induced current is supplied to the heating element 114 where thermal energy is dissapated. For example, if the TEC 106 is a component of a pacemaker, a coil 112 in the form of a pickup loop can be placed external to the patient's body and over the implantation site of the pacemaker. As the pacemaker heats the TEC 106, the pickup loop can detect the change in magnetization of the magnetocaloric material of the TEC 106. The change in magnetization induces a current through the pickup loop, which is dissipated as work outside the patient's body by the side where heat is dissipated 110 of the cooling device. In other implementations, the side to be cooled 102 and the side where heat is dissipated 110 each include antennas in place of, or in addition to, the inductive coils. The antennas can be use to radiatively couple the side to be cooled 102 and the side where heat is dissipated 110 together.

The TEC 106 is coupled to the heat source 108. The heat source 108 can be any device or source that needs to be cooled. For example, the heat source 108 can be a component of a laptop, phone, radio, medical device, or other electronic or mechanical device. In some implementations, the heat source 108 is a component of an implantable medical device, such as a cardiac pacemaker, defibrillator, deep brain stimulator, or vagus never stimulator. For example, the side to be cooled 102 may be implemented as a component of the implantable medical device. The side to be cooled 102 can enable heat generated by the implantable medical device to be dissipated outside the body. As the side to be cooled 102 cyclically converts heat generated by the heat source 108 to work, the net heat absorbed by the side to be cooled 102 serves to reduce the temperature of the heat source 108. In some implementations, the system 100 can prevent an implantable medical device from rising more than 1° C. when the medical device is in operation. In some implementations, the TEC 106, and the systems described herein, are used to cool larger objects that compared to medical devices. For example, the TEC 106 can be integrated into uniforms or protective garments (e.g., a soldier's uniform) to provide cooling to the wearer. In these examples, heat that can be trapped by the protective garment is transferred and dissipated external to the garment.

The system 100 also includes a side where heat is dissipated 110. The side where heat is dissipated 110 is supported by a housing spaced apart from the side to be cooled 102. In some implementations, one or more components of the side where heat is dissipated 110 can be located outside of the housing. For example, the heating element 114 can include a resistor that it coupled to the outside of the housing to better enable dissipation of the thermal energy generated by the heating element 114. The side where heat is dissipated 110 also includes a coil 112. As described above, the coil 112 and the inductive element 104 are configured to inductively couple with one another. Current induced in the coil 112 by current flowing through the inductive element 104 is used to generate thermal energy at the heating element 114. At some steps of the methods described herein, current is also supplied to the coil 112 from the power supply 116. The flow of current through the coil 112 induces a current flow through the inductive element 104. The induced current flow through the inductive element 104 is passed to the TEC 106 and constitutes work put into the system 100.

The side where heat is dissipated 110 also includes a heating element 114. The heating element 114 converts current (or more generally, electrical energy) into thermal energy, which is then dissipated to the environment. In some implementations, the heating element 114 is a resistor. A coolant system 118 is in thermal contact with the heating element 114. In some implementations, the coolant system 118 is a heat sink or an active coolant system such as a circulating coolant that absorbs the thermal energy dissipated by the heating element 114. The heat sink can be an aluminum alloy or copper based heat sink. In some implementations, the system 100 does not include a coolant system 118 and the thermal energy generated by the heating element 114 is passively dissipated into the surrounding environment.

The system 100 also includes a controller 120. The controller 120 is coupled to the side where heat is dissipated 110, and in some implementations is wirelessly coupled to the side to be cooled 102. The controller 120 controls the activation of switches within the side to be cooled 102 and the side where heat is dissipated 110 to modulate the activation of the TEC 106. The controller 120 also controls when the power supply 116 supplies current to the coil 112 to induce a current through the inductive element 104 to provide work in the form of electrical energy to the side to be cooled 102. In some implementations, the controller 120 is a programmable processor or a computer. The controller 120 can include specialty purpose location, such a field programmable gate array (FPGA) or an application-specific integrated circuit (ASIC).

Figure 2:
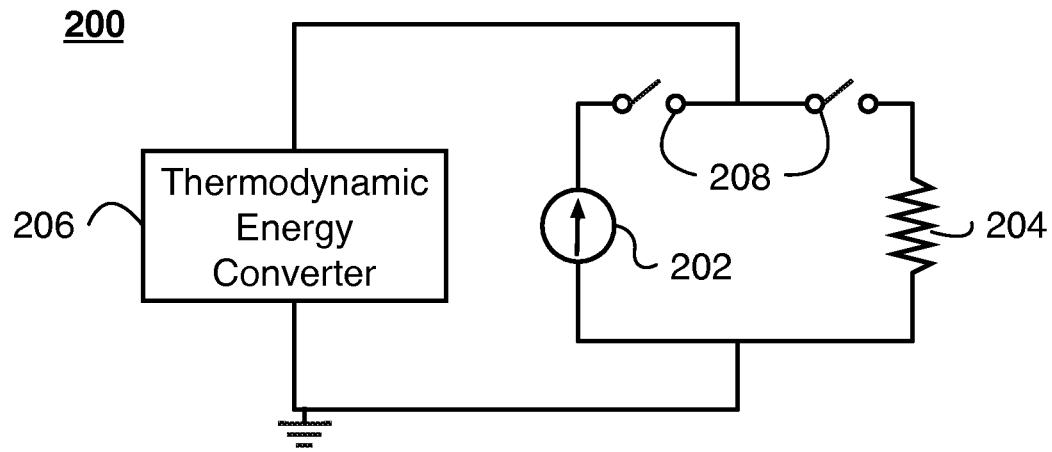
FIG. 2 illustrates a schematic of an example cooling device for use in the system illustrated in FIG. 1.

FIG. 2 illustrates a schematic of an example cooling device 200 for use in the system 100 illustrated in FIG. 1. The cooling device 200 converts thermal energy at a side to be cooled into electrical energy, which is converted back to thermal energy at a side where heat is dissipated. In the cooling system 200, the side where heat is dissipated and the side to be cooled are electrically coupled with wires. As illustrated, a power source 202 and a heating element 204 (e.g., a resistor) are connected in parallel. A TEC 206 is connected in series with the power source 202 and the heating element 204. Switches 208 are connected in series with each of the power supply 202 and the heating element 204 to control whether current flows from the power source 202 to the TEC 206 or from the TEC 206 through the heating element 204. As an overview, heat is absorbed by the TEC 206. The TEC 206 induces a current flow using at least a portion of the absorbed heat. With the switch 208 in series with the heating element 204 closed, the current flows through the heating element 204 generating thermal energy that is dissipated remotely from the TEC 206.

Based on the first law of thermodynamics, the cooler system 200 must conserve energy. Accordingly, the change in energy of the system ($\Delta U$) is equal to the heat (Q) added to the system plus the work done (W) to the system. This is represented mathematically as:

$$\Delta U = Q + W \qquad 1$$

The heat is given by:

$$dQ = Tds \qquad 2$$

In Equation 2, T is the temperature and dS is the change in entropy. For a cyclic process this becomes:

$$\Delta U = 0 \text{ and } \oint dq = -\oint \delta W \qquad 3$$

For a refrigeration cycle, the total work put into the system must equal the balance of heat:

$$dU = 0 = W_{in} + Q_{in} + Q_{out} \; [Q_{out} < 0] \qquad 4$$

Power cycles, in which work is produced, also conserve energy per the above equation, except that in power cycles work is output. In some implementations, a power cycle can be used to remove heat.

The second law of thermodynamics also requires that the entropy of a system cannot decrease. For a reversible cycle, such as the cycle performed by the cooler systems described herein, dS=0, and:

$$\Delta S = \frac{Q_c}{T_c} + \frac{Q_h}{T_h} = 0 \qquad 5$$

The work that is input into the system to complete the reversible cooling cycle is provided by:

$$W = -Q_h - Q_c = \frac{T_h - T_c}{T_c} Q_c \qquad 6$$

In some implementations, the efficiency of the cooling system is calculated by the ratio of the work provided to the system to the heat extracted at the low temperature. This ratio is provided by:

$$\gamma_c = \left(\frac{Q_c}{W}\right)_{rev} = \frac{T_c}{T_h - T_c} \qquad 7$$

where $T_c$ refers to the temperature at the side to be cooled and $T_h$ refers to the temperature at the side where heat is dissipated.

Applying the above equations to the system 200, and assuming that the TEC 206 includes a pyroelectric material, the change in the energy of the system ($\Delta U$) can be rewritten as:

$$dU = TdS + EdD \qquad 8$$

Next, the Helmholtz Free energy can be calculated as:

$$dF = -SdT - DdE \qquad 9$$

For small variations around the equilibrium of the Helmholtz Free energy, constitutive equations can be written as:

$$dD = \varepsilon dE + pdT$$

$$dS = pdE + C_v dT/T \qquad 10$$

where p is the pyroelectric coefficient and $C_v$ is the heat capacity of the pyroelectric material per unit volume, $\varepsilon$ represents the dielectric permittivity, D the displacement field, and S the entropy.

With the above equations, a number of thermodynamic cycles are possible with the cooling system 200. Each leg of the cycle can be calculated by placing constraints on equation 10.

In a first leg, the constraint is that dS=0. This leg is adiabatic and work can be performed on the system without heating the system. Setting dS=0, equation 10 becomes:

$$-\frac{p}{C_v} dE = \frac{dT}{T} \qquad 11$$

Integrating equation 11, from an initial electric field ($E_i$) and initial temperature ($T_i$) to a final electric field ($E_f$) and final temperature ($T_f$) provides:

$$\ln\left(\frac{T_i}{T_f}\right) = \frac{p}{C_v}(E_f - E_i) \qquad 12$$

Expanding equation 12 with a Taylor expansion provides:

$$pT_f(E_f - E_i) = C_v(T_i - T_f) \qquad 13$$

The work done to the system per unit volume is given by the energy density associated with charging the pyroelectric capacitor by with the power system 202.

$$W_{adiabatic} = \int E \cdot \delta D \qquad 14$$

Using equation 10, equation 14 becomes:

$$W_{adiabatic} = \int_{start}^{end} E\varepsilon \delta E + \int_{start}^{end} Ep\delta T \qquad 15$$

Replacing the first team with the electrical work provided to the system by the power supply 202, equation 15 becomes:

$$W_{adiabatic} = \frac{1}{2}\varepsilon(E_f^2 - E_i^2) + \int_{start}^{end} Ep\delta T \qquad 16$$

Integrating by parts and substituting the isentropic condition from equation 11, equation 16 simplifies to:

$$W_{adiabatic} = \frac{1}{2}\varepsilon(E_f^2 - E_i^2) + pE_i(T_f - T_i) \qquad 17$$

In a second leg of the cycle, the constraint is that dD=0. In this leg the TEC 206 absorbs heat. With dD=0, equation 10 becomes:

$$\frac{-\varepsilon}{p}(E_f - E_i) = (T_f - T_i) \qquad 18$$

Equation 18 give the voltage associated with the pyroelectric capacitor of the TEC 206 in response to the heat absorbed by the TEC 206. The entropy change during the heat absorption process is:

$$Q_{oc} = C_v(T_f - T_i) - \frac{p^2}{2\varepsilon}(T_f^2 - T_i^2) \qquad 19$$

In a third leg, dT=0 is set as the constraint. When dT=0 the leg is isothermal; however, work is done during the leg. In this leg the work done is:

$$W = \int E \cdot \delta D \qquad 20$$

Using equation 10, the work done during the isothermal path is:

$$W_{isothermal} = \frac{1}{2}\varepsilon(E_f^2 - E_i^2) \qquad 21$$

In the fourth leg, dE=0. In some implementations, of this leg no work is done but heat can be transferred. Setting dE=0 in equation 10 and integrating provides that the change in entropy is:

$$S_f - S_i = C_v(T_f - T_i)/T_i \qquad 22$$

Using the above described legs, a thermodynamic cycle can be generated for the cooling system 200.

Figure 3:
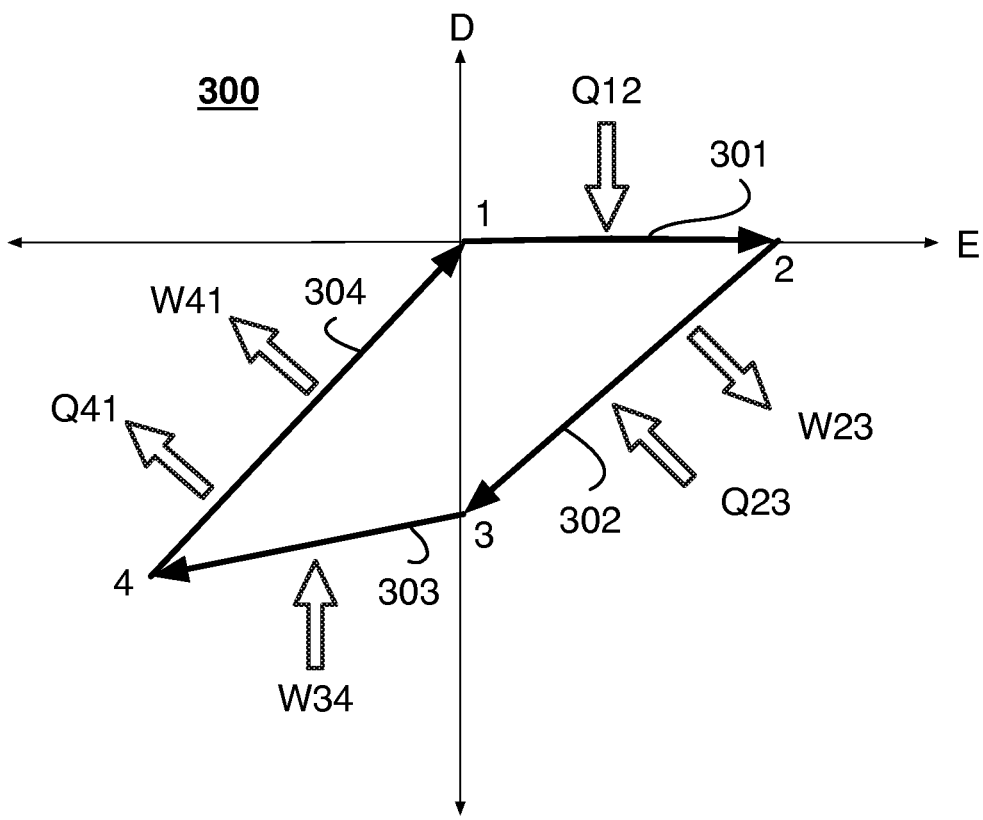
FIG. 3 illustrates an example thermodynamic cycle for use with the cooling device illustrated in FIG. 2.

FIG. 3 illustrates an example thermodynamic cycle 300 for the cooling system 200 using the above-described thermodynamic equations. The thermodynamic cycle 300 includes four legs. During leg 301, substantially no work is performed on the system and the TEC absorbs heat (Q12) from the element or environment to be cooled. Next, during leg 302, the pyroelectric capacitor of the TEC discharges. The discharge of the capacitor generates work (W23) in the form of electrical energy. As described in relation to FIGS. 2 and 4, the electrical energy generated by the discharge of the capacitor can induce a current flow, which is transmitted (wirelessly or wired) to the side where heat is dissipated of the device. On the side where heat is dissipated of the device, the electrical energy is converted back into thermal energy and dissipated. Also during leg 302, the TEC continues to absorb heat (Q23) from the element or environment to be cooled. Because the thermal timescale of the heat (Q23) absorbed by the pyroelectric capacitor is at least one order of magnitude larger than the rate at which the pyroelectric capacitor discharges, the pyroelectric capacitor discharges at a faster rate than the pyroelectric capacitor heats during this leg. During leg 303, work (W34) in the form of electrical energy is input into the system. The work (W34) is provided to the system from the power source of the system. The work (W34) adiabatically charges the pyroelectric capacitor. In some implementations, the pyroelectric capacitor is charged slowly and reversibly, which allows the temperature of the pyroelectric capacitor to adjust to the electric field applied to the pyroelectric capacitor. The charging of the pyroelectric capacitor occurs at a faster rate than the pyroelectric capacitor absorbs heat during the leg 303 such that there is substantially no thermal input during leg 303. During leg 304, the pyroelectric capacitor discharges again generating work (W41) in the form of electrical energy and heat (Q41). As described above, heat is absorbed by the TEC during legs 301 and 302. The efficiency of the TEC is calculated as the ratio of the total work done on the TEC to the heat absorbed by the TEC.

Table 1 summarizes the heat and work input and generated by the system during each of the legs of the thermodynamic cycle 300 using the above described equations.

TABLE 1

Summary of the heat and work input and generated by the system during each of the legs of the thermodynamic cycle 300.

| Leg | Work | Heat |
|---|---|---|
| Leg 301 | $W_{12} = 0$ | $Q_{12} = C_v(T_2 - T_1) - \frac{p^2}{2\varepsilon}(T_2^2 - T_1^2)$ |
| Leg 302 | $W_{23} = \frac{1}{2}\varepsilon(-E_2^2)$ | $Q_{23} = -pT_2E_2$ |
| Leg 303 | $W_{34} = \frac{1}{2}\varepsilon E_4^2$ | $Q_{34} = 0$ |
| Leg 304 | $W_{41} = -\frac{1}{2}\varepsilon E_4^2$ | $Q_{41} = -pT_4E_4$ |

For a system where the TEC includes a magnetocaloric material, the constitutive equations can be written as:

$$dB = \mu dH + \gamma dT \qquad 23$$

$$dS = \frac{C_v}{T_c}dT + \gamma dH \qquad 24$$

γ is defined as:

$$\gamma = \mu_o dM_r/dT \qquad 25$$

In a second order transition, γ is negative and Mr decreases monotonically toward zero as the temperature increases towards the Curie temperature. For gadolinium, γ is about −36 mT/K. To create a closed loop cycle, a current is provided to the magnetocaloric material of the TEC to cool the TEC. The current (I₂) is supplied to the TEC from the side where heat is dissipated to re-magnetize the magnetocaloric material of the TEC after the magnetocaloric is at least partially demagnetized after absorbing thermal energy. The current is applied to the magnetocaloric material at a frequency to periodically re-magnetize the magnetocaloric material at a faster rate than the magnetocaloric material comes to a thermal equilibrium. In some implementations, the frequency is between about 10 kHz and about 200 kHz, between about 50 kHz and about 150 kHz, or between about 75 kHz and about 125 kHz.

Figure 4:
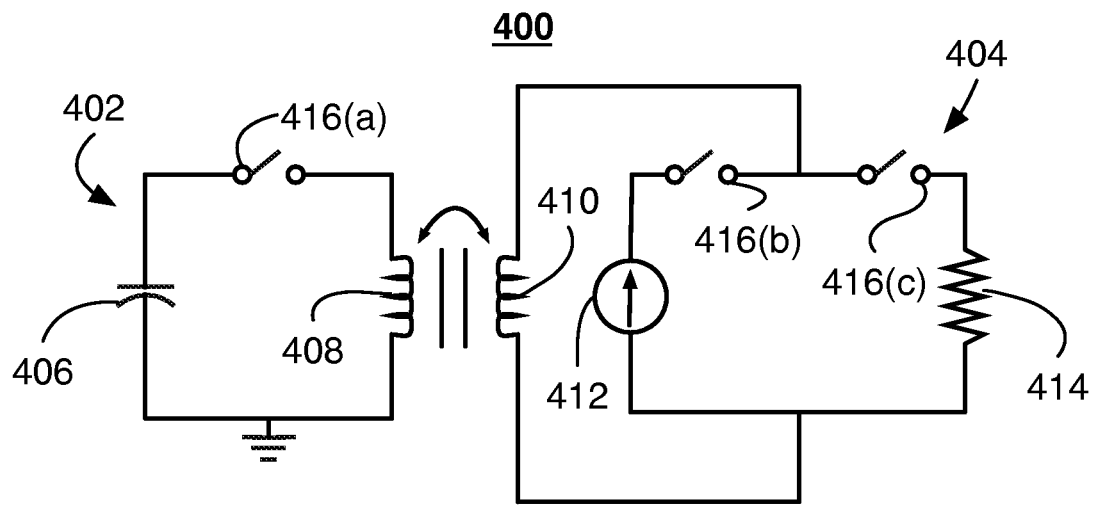
FIG. 4 illustrates a schematic of an example wireless cooling device with a pyroelectric capacitor for use the system illustrated in FIG. 1.

FIG. 4 illustrates a schematic of an example wireless cooling device 400 with a pyroelectric capacitor. The cooling device 400 includes a side to be cooled 402 and a side where heat is dissipated 404. The TEC of the side to be cooled 402 is configured as a pyroelectric capacitor 406. The side to be cooled 402 includes a first coil 408. The first coil 408 is configured to wirelessly couple with the second coil 410 of the side where heat is dissipated 404. The side where heat is dissipated 404 also includes a power supply 412 and a heating element 414 (e.g., resistor). The side where heat is dissipated includes switches 416(a)-416(c).

In principle, the cooling cycle of the cooling device 400 works the same as the cooler system described in relation to FIGS. 2 and 3; however, the side to be cooled 402 and the side where heat is dissipated 404 communicate with one another by inductively coupling the first coil 408 and the second coil 410. The method of operating the cooling device 400 is described in greater detail in relation to FIG. 6. As an overview, the switch 416(a) is opened and the pyroelectric capacitor 406 absorbs heat from the heat source to which it is coupled. When the switch 416(a) is closed, the pyroelectric capacitor 406 discharges and induces a current to flow through the coil 408, which inductively induces a current to flow through the coil 410. With switch 416(b) open and switch 416(c) closed, the current induced in the coil 410 flows to the resistor 414, where it is dissipated to the external environment as thermal energy. Switch 416(b) can then be closed and switch 416 (c) opened. Current can be flowed through the coil 410, which inductively induces a current in the coil 408. The current induced in the coil 408 charges the pyroelectric capacitor 406 and constitutes work put into the system. The cycle can then repeat.

Figure 5:
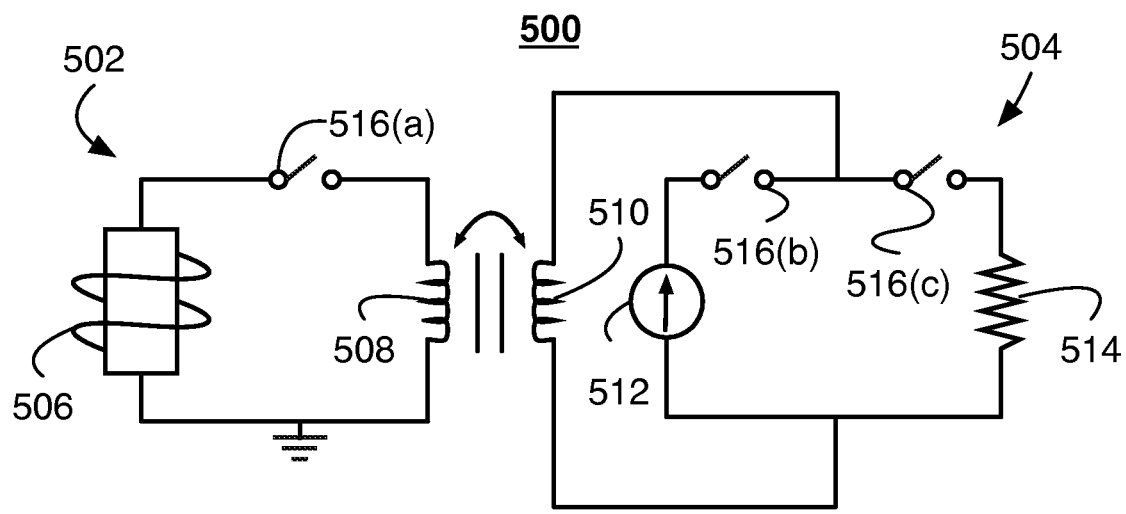
FIG. 5 illustrates a schematic of an example wireless cooling device with a magnetocaloric inductor for use the system illustrated in FIG. 1.

FIG. 5 illustrates a schematic of an example cooling device 500 with a magnetocaloric inductor. The cooling device 500 includes a side to be cooled 502 and a side where heat is dissipated 504. The TEC of the side to be cooled 502 is configured as a magnetocaloric inductor 506. The magnetocaloric inductor 506 includes a magnetocaloric material with a coil wrapped around the magnetocaloric material. The side to be cooled 502 includes a first coil 508. The first coil 508 is configured to wirelessly couple with the second coil 510 of the side where heat is dissipated 504. The side where heat is dissipated 504 also includes a power supply 512 and a heating element 514 (e.g., resistor). The side where heat is dissipated also includes switches 516(a)-516(c).

The cooling cycle of the cooling device 500 works in a method similar to the above-described method of operation for the cooling device 400. The method of operating the cooling device 500 is also described in greater detail in relation to FIG. 6. As an overview, the switch 516(a) is closed and the magnetocaloric inductor 506 absorbs heat, which causes a change in the magnetization of the magnetocaloric material in the magnetocaloric inductor 506. The change in magnetic filed induces a current flow through the coil 508, which in turn induces a current flow through the coil 510. In this step, heat transfer and work occur simultaneously, which results in an increase in both temperature and entropy. The temperature of the magnetocaloric inductor 506 (and thus the heat source coupled to the magnetocaloric inductor 506) is reduced by closing switch 516(b) and flowing a current through coil 510. The current flow through coil 510 inductively induces a current flow through coil 508. The current flowing through the coil of the magnetocaloric inductor 506 adiabatically de-magnetizes the magnetocaloric material and reduces the temperature of the magnetocaloric inductor 506. The entropy of the system is then reduced by isothermally magnetizing the magnetocaloric material.

Figure 6:
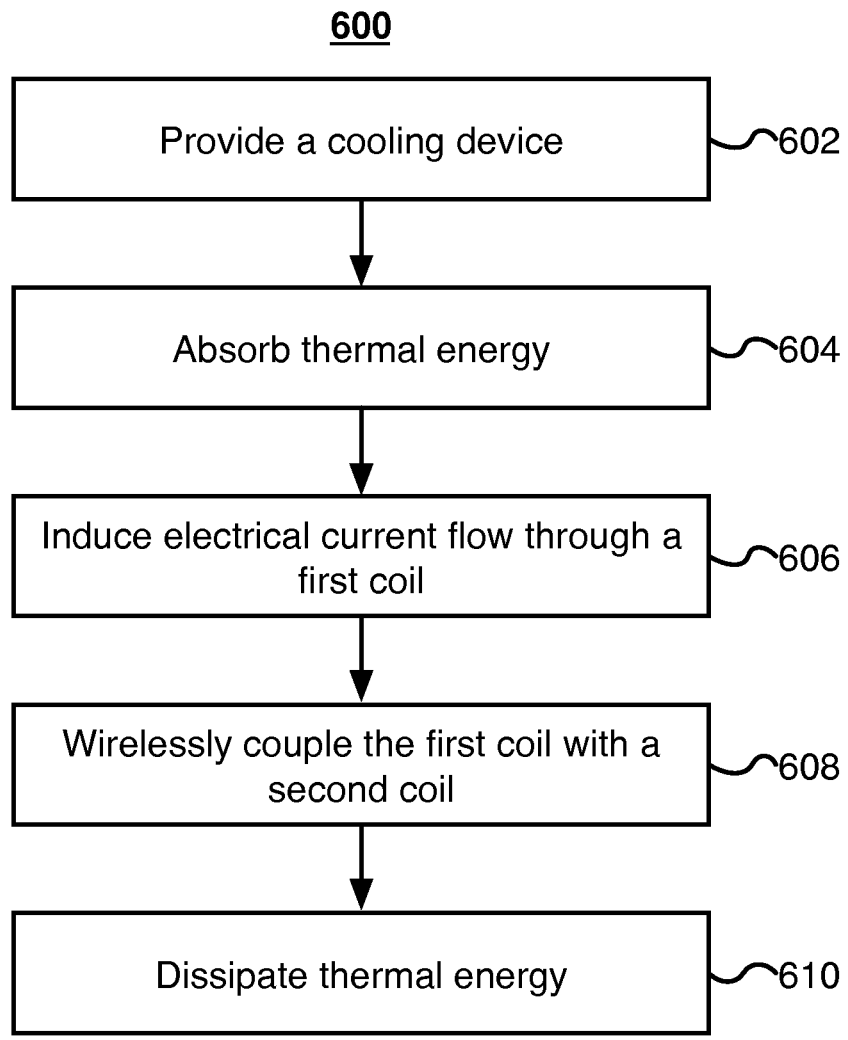
FIG. 6 illustrates a flow diagram of an example method for cooling an object using the system illustrated in FIG. 1.

FIG. 6 illustrates a flow diagram of an example method 600 for cooling an object. The method 600 includes providing a cooling device (step 602). The method 600 also includes transferring thermal energy from a side to be cooled of the cooling device to a side where heat is dissipated of the cooling device. The thermal energy is transferred by absorbing thermal energy at the side to be cooled (step 604), and then inducing an electrical current through a first coil (step 606). The method 600 then includes wirelessly coupling the first coil to a second coil (step 608). Current induced in the second coil is used to dissipate thermal energy at the side where heat is dissipated of the cooling device (step 610).

As set forth above, the method 600 includes providing a cooling device (step 602). The cooling device can be similar to one of the cooling devices described in relation to FIGS. 4 and 5; however, a similar method can be used to cool an object using any of the cooling devices described herein. The cooling device includes a side to be cooled and a side where heat is dissipated. The side to be cooled includes a thermodynamic energy converter and a first coil electrically coupled to the thermodynamic energy converter. The side where heat is dissipated, which is spaced away from the side to be cooled, includes a second coil that is configured to inductively couple with the first coil. The side where heat is dissipated also includes a heating element (e.g., a resistor) electrically coupled to the second inductive coil. In one example, the side to be cooled is placed in an implantable medical device, such as a cardiac pacemaker, and the side where heat is dissipated is placed external to the patient. In this example, the method 600 can convert thermal energy generated by the cardiac pacemaker into electrical energy, which is dissipated as thermal energy outside the patient's body.

The method 600 also includes absorbing thermal energy (step 604). The thermal energy is absorbed by the TEC of the side to be cooled. The TEC can include a pyroelectric capacitor or a magnetocaloric material, which can induce a current flow when exposed to changing temperatures caused by the absorption of thermal energy. Continuing the above example, the TEC can be coupled to the cardiac pacemaker and absorb thermal energy generated during the operation of the cardiac pacemaker.

Next, an electrical current is induced through the first coil (step 606). The current is induced in the first coil by the TEC, which uses at least a portion of the absorbed thermal energy to induce the current flow through the first coil. In a device with a pyroelectric capacitor, the pyroelectric capacitor absorbs thermal energy, which causes a change in the polarization of the pyroelectric material of the pyroelectric capacitor. The charge built up by the polarization of the pyroelectric material is released when a switch is closed on the side to be cooled of the cooling device. The charge release causes a current flow through the first coil. In a device with a TEC that includes a magnetocaloric material, the absorption of the thermal energy by the magnetocaloric material causes a change in the magnetization of the magnetocaloric material. The change in the magnetic field then induces a current flow through a coil wrapped around the magnetocaloric material. The current induced by the changing magnetic field flows through the first coil.

The first coil is wirelessly coupled to the second coil (step 608). The current flowing through the first coil induces a voltage across the second coil through electromagnetic induction, which causes current to flow through the side where heat is dissipated of the cooling device. As described above, in some implementations, the side to be cooled of the cooling device does not include an inductive coil and the inductive coil of the side where heat is dissipated directly couples with the TEC. In these implementations, as the magnetocaloric material of the TEC absorbs heat, the magnetocaloric material decreases in magnetization. The changing magnetic field generated by the TEC directly couples with the second coil to induce a current flow through the second coil.

The current induced in the second coil is used to dissipate thermal energy at the side where heat is dissipated (step 610). As described in relation to FIGS. 4 and 5, the second coil is electrically coupled to a heating element, such as a resistor. With the switch closed between the second coil and the heating element the induced current is flows to the heating element. The heating element converts the electrical energy to thermal energy. The thermal energy is then dissipated into the environment. In some implementations, the dissipation of the thermal energy is assisted by coolant system coupled to the heating element. The coolant system can include a heat sink, a liquid coolant system, or a combination thereof. In other implementations, the side where heat is dissipated of the cooling device includes other electronic components in addition to, or in place of, the heating element. For example, rather than dissipate the electrical energy as thermal energy the electrical energy can be harvested to do work on the side where heat is dissipated. As an example, the side where heat is dissipated may include a battery to which the induced current is supplied. The battery can store the energy for later use. In another example, the induced current can be used to power other electronics, such as a controller for the device.

In some implementations, the method 600 also includes wirelessly supplying electrical energy to the TEC from the side where heat is dissipated of the cooling device. As described above, work must be supplied to the cooling device to conform to the thermodynamic laws of energy conservation. Work is also supplied to the cooling device, because the TEC is perfectly efficient in converting the absorbed thermal energy into electrical energy. In some implementations, the work is supplied to the side to be cooled of the cooling device from the side where heat is dissipated of the cooling device. For example, the side where heat is dissipated of the cooling device can include a power supply that induces a current flow through the second coil. The second coil inductively couples with the first coil to induce a current flow through the first coil and supply work to the side to be cooled of the device. The current induced in the first coil is supplied to the TEC to charge the pyroelectric capacitor or magnetize and de-magnetize the magnetocaloric material. In an example where the TEC includes a magnetocaloric material, the work put into the side to be cooled enables the entropy and temperature of the side to be cooled to be reduced. For example, when the current flows through the coil around the magnetocaloric material, the magnetocaloric material adiabatically de-magnetizes, which causes a reduction in the temperature of the magnetocaloric material. When the current stops flowing through the coil around the magnetocaloric material, the magnetocaloric material isothermally magnetizes, which reduces the entropy of the magnetocaloric material.

The disclosed system and methods may be embodied in other specific forms without departing from the spirit or essential characteristics thereof. The forgoing implementations are therefore to be considered in all respects illustrative, rather than limiting of the invention.

What is claimed:

1. A cooling device comprising:
   a side where heat is dissipated; and
   a side to be cooled spaced away from the side where heat is dissipated, the side to be cooled comprising:
      a magnetocaloric material configured to absorb thermal energy from a heat source and generate a changing magnetic field using the absorbed thermal energy to inductively couple, using a first coil, to a second coil on the side where heat is dissipated, and
      a first switch between the magnetocaloric material and the first coil;
   the side where heat is dissipated comprising:
      the second coil;
      a second switch electrically coupled to the second coil;
      a load resistor electrically coupled to the second coil and configured to dissipate thermal energy;
      a power supply electrically connected with the second coil; and
      a controller configured to modulate the power supply.

2. The cooling device of claim 1, wherein the magnetocaloric material comprises at least one of gadolinium, lathanum, and manganese.

3. The device of claim 1, wherein the magnetocaloric material comprises a capacitor comprising a pyroelectric material.

4. The device of claim 3, wherein the pyroelectric material comprises at least one of a ferroelectric ceramic and a ferroelectric crystal.

5. The cooling device of claim 1, wherein the magnetocaloric material is configured to cause a first current to flow through the first coil when the magnetocaloric material is adiabatically demagnetized.

6. The cooling device of claim 1, wherein the magnetocaloric material is configured to be adiabatically magnetized based on a second current generated by the power supply.

7. The cooling device of claim 1, further comprising a coolant system configured to receive heat from the load resistor.

8. The cooling device of claim 1, further comprising a third switch between the power supply and the second switch, the second switch between the third switch and the load resistor.

9. The cooling device of claim 1, wherein the magnetocaloric material is configured to absorb heat responsive to closing of the first switch, and to decrease in temperature responsive to closing of the second switch.

10. A cooling device, comprising:
    a side to be cooled comprising:
       a magnetocaloric material configured to absorb thermal energy from a heat source and generate a changing magnetic field using the absorbed thermal energy to inductively couple, using a first coil, to a second coil on a side where heat is dissipated; and
       a first switch between the magnetocaloric material and the first coil;
    wherein the side where heat is dissipated is spaced away from the side to be cooled and comprises:
       a second switch electrically coupled to the second coil;
       a load resistor electrically coupled to the second coil, the load resistor configured to dissipate thermal energy; and
       a power supply configured to induce a current in the second coil that re-magnetizes the magnetocaloric material after the magnetocaloric material is at least partially demagnetized after absorbing the thermal energy; and
       a controller configured to periodically actuate the power supply to effectuate transfer of the thermal energy from the side to be cooled to the side where heat is dissipated.

11. The cooling device of claim 10, wherein the magnetocaloric material comprises at least one of at least one of gadolinium, lathanum, and manganese.

12. The cooling device of claim 11, wherein the controller is configured to modulate the power supply such that the power supply induces the current in the second coil at a predetermined frequency.

13. The cooling device of claim 12, wherein the second coil is a second coil of a transformer, and wherein a first coil of the transformer is inductively coupled to the second coil and is electrically coupled to the magnetocaloric material.

14. The cooling device of claim 13, wherein the magnetocaloric material is configured to cause a second current to flow through the first coil of the transformer, inducing a third current in the second coil that is dissipated via the load resistor.

15. The cooling device of claim 10, further comprising a coolant system configured to receive heat from the load resistor.

16. The cooling device of claim 10, further comprising a third switch between the power supply and the second switch, the second switch between the third switch and the load resistor.

* * * * *